April 23, 1968 R. G. KAMLET 3,379,331
PACKAGEABLE TEABAG RECEPTACLE
Filed March 1, 1967
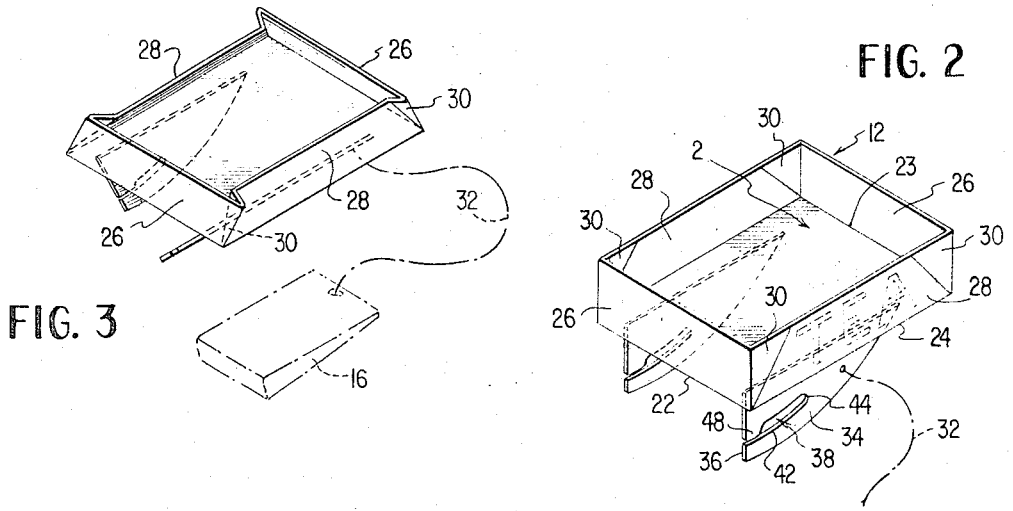
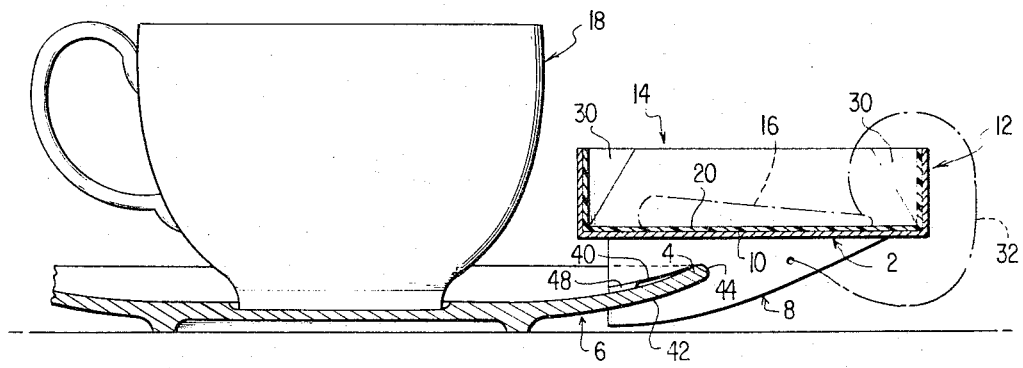
FIG. 1
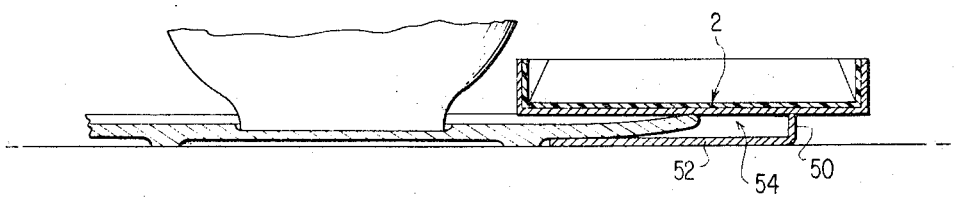
FIG. 4
*INVENTOR*
ROSALIND G. KAMLET

United States Patent Office 3,379,331
Patented Apr. 23, 1968

3,379,331
PACKAGEABLE TEABAG RECEPTACLE
Rosalind G. Kamlet, 11011 Childs St.,
Silver Spring, Md. 20901
Filed Mar. 1, 1967, Ser. No. 619,826
10 Claims. (Cl. 220—23.83)

ABSTRACT OF THE DISCLOSURE

An individual disposable teabag receptacle adapted to be positioned on the rim of a saucer to receive a soaked teabag is attached to each teabag in a box thereof. The teabag receptacle includes a base adapted to be supported horizontally on the rim of the saucer by support means depending from the base and further includes wall means extending upwardly around the edge of the base to define a teabag receiving enclosure. Both the wall means and the support means may be folded closely adjacent the base to place the teabag receptacle in a generally flat inoperative condition prior to use in which each receptacle occupies a minimum of space in the box of teabags.

BACKGROUND OF INVENTION

This invention relates to a disposable special receptacle for a soaked teabag and foldable when not in use to occupy a minimum of space.

In using a conventional teabag to make a cup of tea, it is customary to remove the soaked teabag from the cup prior to drinking. After removal of the teabag it is frequently placed in the saucer while the tea is drunk.

Such placing of the teabag in the saucer may, however, prove unsatisfactory for a number of reasons. For example, tea frequently continues to drain from the soaked teabag into the saucer which is not only messy and unsightly but provides a reservoir of tea about the base of the cup from which drips of tea may inadvertently be transferred to external areas such as the drinker's clothing, tablecloths and the like, each time the cup is removed from a saucer for drinking.

Another problem arises due to the well-known tendency of such a soaked teabag to slide to the center of the saucer each time the cup is removed. In this event, it is often necessary to manually move the teabag out of the way each time it is desired to replace the cup, with resulting tea-straining of the drinker's fingers.

For these reasons a number of prior attempts have been made to provide a teabag receptacle adapted to be positioned on the saucer rim, to receive the soaked teabag. These prior teabag receptacles have usually been characterized by a rigid, three-dimensional structure having an open teabag receiving container and a depending support adapted for connection to the saucer.

Such prior devices have, however, generally proven unsatisfactory both to tea drinkers and also to potential users of the teabag receptacles as a promotional item. The former often found the need for washing and storing the receptacle between uses too much trouble, while the latter found the devices unsuitable for promotional use firstly because the devices were frequently too bulky to be received within the limited free space existing in boxes of teabags and, secondly, because they were too costly to be furnished on a "give-away" basis.

SUMMARY OF INVENTION

It is a particular object of the invention to provide a teabag receptacle which is particularly suitable for use as a promotional item by marketers of teabags.

It is another particular object of the invention to provide a teabag receptacle which may be folded to an inoperative position prior to use in which it occupies a minimum of space.

It is a further object of the invention to provide a teabag receptacle which may be produced at a particularly low cost to enable the receptacle to be employed as a single-use, disposable, "give-away" item.

THE DRAWINGS

In accordance with these objects, a packageable teabag receptacle forming one preferred embodiment of the present invention is illustrated in the accompanying drawings in which:

FIGURE 1 is a cross-sectional side view of the preferred embodiment of the packageable teabag receptacle, shown in a fully unfolded condition thereof positioned on a rim of a saucer;

FIGURE 2 is a perspective view of the packageable teabag receptacle shown in FIGURE 1, in an unfolded condition;

FIGURE 3 is a perspective view of the packageable teabag receptacle shown in FIGURE 2 shown in a partially folded condition; and FIGURE 4 is a cross-sectional side view of another embodiment of the packageable teabag receptacle shown in a fully unfolded condition and positioned on a rim of a saucer.

DETAILED DESCRIPTION

Referring to FIGURE 1, the preferred embodiment shown includes a flat rectangular base 2 adapted to be supported in a generally horizontal plane on a rim 4 of a saucer 6 by a support 8 secured to the underside of the base 2. An upper surface 10 of the base 2 and an upwardly directed wall 12 secured to and extending about the periphery of the upper surface 10 together define an open teabag receiving enclosure 14 within which a soaked teabag 16 may be placed. Both the wall 12 and the base 2 may be printed with advertising and other promotional matter.

It will be appreciated that tea continuing to drain from the soaked teabag 16 will be retained within the enclosure 14 and thus prevented from forming an unwanted liquid reservoir about the base of a cup 18 positioned in the saucer. In this manner the base of the cup will be kept dry so that drops of tea will not be transferred to surrounding surfaces such as tablecloths, the drinker's clothing and the like whenever the cup is taken from the saucer. Additionally, lumps of sugar may be left in the saucer, as is sometimes desired, without causing them to become saturated with tea.

It will further be appreciated that positioning of the soaked teabag 16 within the enclosure 14 prevents the teabag from sliding within the saucer 6 to the position normally occupied by the cup 18 when the latter is removed. In this manner, it is possible to replace the cup easily on the saucer after drinking without first having to move the soggy teabag manually away.

In order to minimize any possible leakage of tea from the enclosure 14, the interior surfaces of the wall 12 and the upper surface 10 of the base are provided with a continuously extending, very thin lining 20. The lining 20 may be formed from any liquid-impervious plastic having good crack- and crease-resistant qualities on folding and in the preferred embodiment comprises polyethylene. However, it will be appreciated that other known plastics possessing these qualities may be utilized.

A particular aspect of the invention (FIGURES 2 and 3) resides in the manner in which the teabag receptacle may be folded prior to use to an inoperative position in which it occupies a minimum of space. The previously mentioned base 2 is of rectangular form defined by spaced opposed forward and rear end edges 22 and 23 respectively and spaced opposed side edges 24. The wall 12 includes spaced, opposed, vertically extending end walls 26 foldably secured to the base 2 along the end edges 22, and spaced opposed side walls 28, vertically co-extensive with the end walls 26, foldably secured to the base 2 along the side edges 24. The sidewalls 28 include conventionally creased portions 30 intgrally connected to the end walls 26 to enable the sidewalls 28 to fold towards each other downwardly into an inoperative position in contact with the upper surface 10 of the base while at the same time the end walls 26 fold towards each other into overlying relation with the sidewalls 28.

It is envisaged that the teabag 16, prior to use, may be placed inside the enclosure 14 before folding of the walls 26 and 28 to the inoperative position so that the walls when subsequently folded downwardly form a packet about and enclosing the dry teabag. The teabag 16 is connected to the support 8 by the usual cord 32, though it will be appreciated that the cord may alternatively be attached to one of the walls 26 and 28.

The previously mentioned support 8 includes two spaced opposed depending, generally triangular sheets 34 disposed symmetrically about and parallel to the longitudinal axis of the base 2. The sheets 34 shown in an operative folded-down position in FIGURES 1 and 2 are initially disposed in an inoperative position lying parallel to and abutting the underside of the base 2.

Each sheet 34 includes a forward edge 36 spaced a short distance rearwardly from the forward edge 22 of the base and in the operative position of the sheet 34, extending perpendicularly downwardly from the base 2. A slot 38 extending upwardly and rearwardly curved from the forward edge 36 in each sheet 34 is defined by vertically spaced upper and lower edges 40 and 42 respectively and a transverse edge 44 intersecting the upper and lower edges. The transverse edge 44 is positioned below and forwardly adjacent the midpoint of the base 2 so that with the rim 4 of the saucer abutting the transverse edge 44, the midpoint of the base 2 of the teabag receptacle is adjacent and spaced slightly outwardly of the rim of the saucer. The slots 38 in the two sheets 34 are in transverse alignment with each other.

The edges 40 and 42 defining the slot 38 are spaced sufficiently apart to fit loosely about the rim 4 of the saucer as shown in FIGURE 1, and may be made slightly divergent in a forward direction for this purpose. Additionally, each upper edge 42 is provided with a depending bead 48 (FIGURE 2) extending rearwardly, for a relatively short portion of the length of the edge 42, from the forward edge 36 of the sheet.

In use, the bead 48 restricts initial entry of the rim 4 of the saucer 6 into the slot and during such entry is bent sidewardly out of the plane of the sheet 34 into abutting contact with the upper surface of the saucer 6 (FIGURE 1) to retain the teabag receptacle securely on the saucer. In this manner, a slot 38 loose enough to accommodate a range of saucer rims of varying thickness and curvature, may be provided while at the same time assuring positive frictional securement of the receptacle to the saucer.

It will be noted that the slotted sheets 34 are additionally so dimensioned in relation to the base 2 as to ensure that the innermost and uppermost portion of the wall 12 nearest the cup 18 is spaced positively away therefrom. Further it will be appreciated that the provision of the supports 34 enables the teabag receptacle to be carried on the rim of the saucer at all times whether the saucer is resting on a table or held in the hand.

Another embodiment of the support 8 shown in FIGURE 4 includes a transversely extending rectangular first sheet 50 secured at its upper edge to the underside of the base 2 and foldable rearwardly and downwardly from an inoperative position against the base 2 to an operative position generally perpendicular thereto as illustrated. Secured to the lower edge of the first sheet 50 and transversely co-extensive therewith is a rectangular forwardly extending second sheet 52. The second sheet is foldable from an inoperative position parallel to and closely adjacent the base 2 to the position shown in FIGURE 1 in which the upper surface of the sheet 52 is spaced below the base 2 to define a slot 54 adapted to receive the rim of the saucer. The lower surface of the sheet 52 may rest against a table or like surface for added stability.

In addition to the slotted supports disclosed above, the supports 8 may alternatively be provided with adhesively coated portions bendable into abutting contact with the saucer and adapted for direct attachment to the saucer by the adhesive.

In constructing a teabag receptacle according to the present invention, it will be seen that a receptacle uniquely adapted for packaging to occupy minimum carton space is provided.

Additionally, the inexpensive disposable character of the teabag receptacle is such as to render the receptacle particularly suitable for promotional purposes.

Particular advantages are afforded by the folding walls and supports which enable the receptacles in an inoperative condition, to occupy a minimum of space within any teabag carton or the like in which they may be placed.

Other advantages are provided by the liquid-impervious lining to the receptacle which prevents leakage of tea therefrom, and by the unique beads on the slotted supports which enable the receptacle to be used on a variety of differently dimensioned saucers.

Although the invention is described with reference to one preferred embodiment, it will be apparent to those skilled in the art that additions, deletions, modifications, substitutions and other changes not specifically described or illustrated in these embodiments may be made which will fall within the purview of the appended claims.

I claim:

1. A packageable teabag receptacle for supporting a used teabag on a rim of a saucer, the saucer being adapted to support a teacup positioned inwardly and generally centrally of the saucer, the packageable teabag support comprising:

a base adapted to be positioned on a portion of the rim of the saucer in an operative position in which said base is generally horizontally disposed, foldable wall means secured to an upper surface of said base, said wall means foldable from an inoperative position closely adjacent the upper surface of said base to an operative position in which said wall means extends upwardly from and generally perpendicular to the upper surface of said base, said wall means in the operative position thereof cooperating with the upper surface of said base to define a three-dimensional, vertically extending enclosure having an open upper end, the enclosure being adapted to receive a teabag, and foldable support means secured to a lower surface of said base, said support means foldable from an inoperative position closely adjacent the lower surface of said base to an operative position in which portions of said support means are spaced from the lower surface of said base, said portions of said support means in the operative position thereof adapted to contact adjacent portions of the saucer to support said base in the operative position thereof on the rim of the saucer.

2. A packageable teabag receptacle as defined in claim 1 wherein;

said portions of said support means adapted to contact the adjacent portions of said saucer are further adapted to space the portions of said wall means most close to a cup positioned on the saucer out of contact therewith when said wall means are in the operative position thereof.

3. A packageable teabag receptacle as defined in claim 2 wherein;

said portions of said support means adapted to contact the adjacent portions of the saucer are coated with adhesive.

4. A packageable teabag receptacle as defined in claim 2 wherein;

the surfaces of said wall means and said base directed interiorly of and defining the enclosure are provided with a liquid-impervious lining.

5. A packageable teabag receptacle as defined in claim 2 wherein;

the upper surface of said base includes a peripheral edge, said wall means comprising a generally stiff but foldable sheet extending continuously about said peripheral edge.

6. A packageable teabag receptacle as defined in claim 5 wherein said support means includes;

at least one generally stiff sheet foldably secured to the lower surface of said base, said sheet including a leading edge extending generally perpendicularly downward from the lower surface of said base in an operative position.

said sheet including a slot defined by vertically spaced generally parallel, arcuate, upper and lower edges intersecting said leading edge of said sheet, said slot adapted to loosely embrace a portion of the saucer with portions of said upper and lower edges abuttingly contacting adjacent portions of the saucer to support said base on the saucer.

7. A packageable teabag receptacle as defined in claim 6 further including, a bead portion on at least one of said upper and lower edges defining said slot, said bead portion projecting towards the other of said edges adjacent said leading edge of said sheet, said bead portion being adapted to be bent out of the plane of said sheet into abutting contact with adjacent portions of the saucer to frictionally retain thereon said sheet.

8. A packageable teabag receptacle as defined in claim 5 wherein;

said base includes forward and rear extremities, said forward extremity adapted to be positioned inwardly of the rim of the saucer and said rear extremity adapted to be positioned outwardly of the rim of the saucer, said support means including, a first generally stiff sheet foldably secured to the lower surface of said base adjacent said rear extremity thereof, said first sheet in the operative position including a lower extremity spaced vertically below the lower surface of said base, a second generally stiff sheet foldably secured to the lower extremity of said first sheet, said second sheet in the operative position extending forwardly generally parallel to the lower surface of said base, said lower surface of said base and said second sheet defining a slot adapted to embrace a portion of the saucer with portions of said base and said second sheet abuttingly contacting adjacent portions of the saucer to support said base on the saucer.

9. A packageable teabag receptacle as defined in claim 5 further including;

a cord having one extremity attached to at least one of said base and said wall means, said cord having another extremity adapted for connection to the teabag.

10. A packageable teabag receptacle as defined in claim 5 wherein said base is generally rectangular.

References Cited

UNITED STATES PATENTS

| | | | |
|---|---|---|---|
| 1,780,957 | 11/1930 | Veder | 220—23.83 XR |
| 2,334,156 | 11/1943 | Hansen. | |
| 2,795,121 | 6/1957 | Pantello | 220—23.83 |

THERON E. CONDON, *Primary Examiner.*

G. E. LOWRANCE, *Assistant Examiner.*